Figure 1:
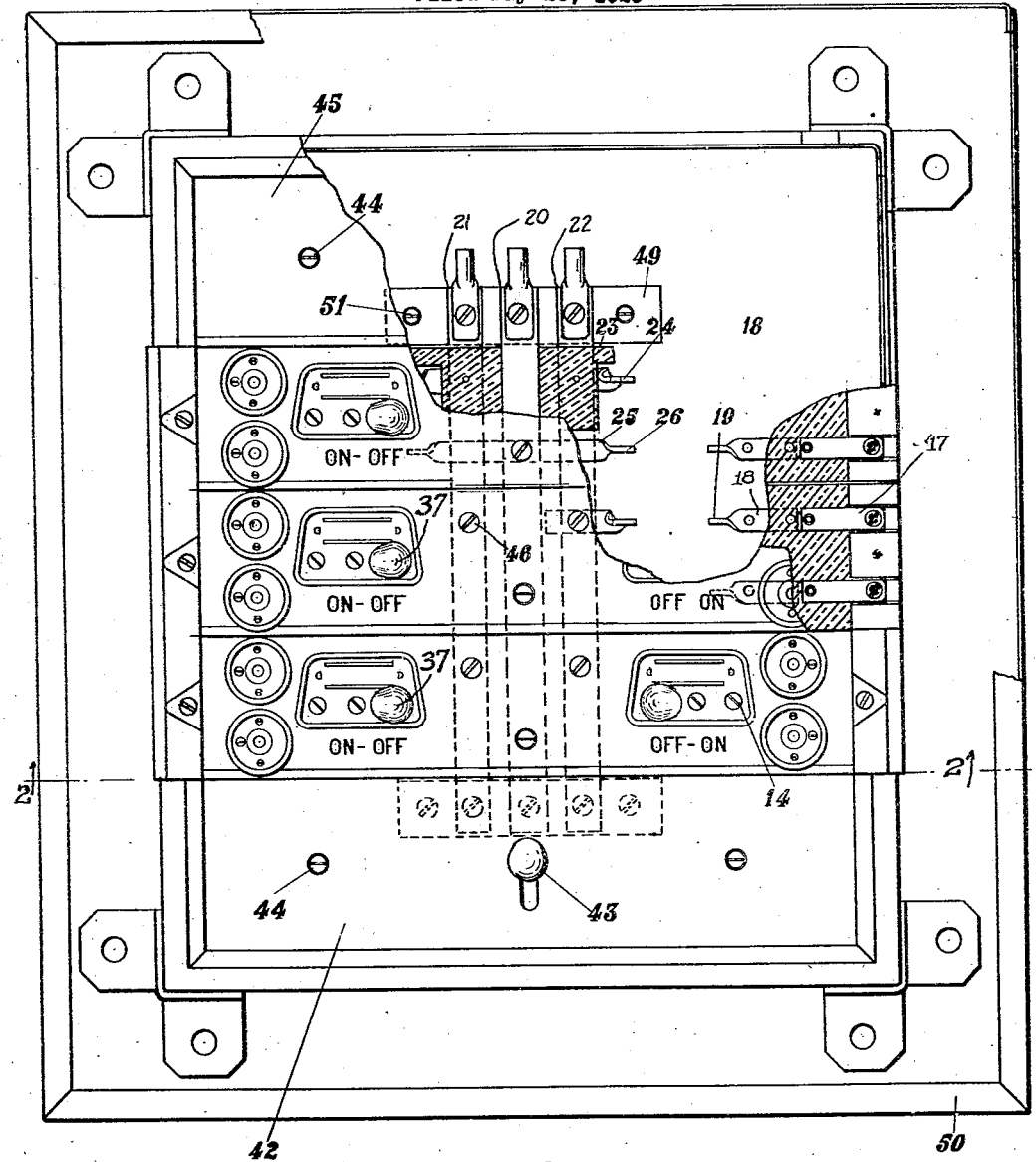

July 21, 1931.   F. B. ADAM   1,815,038
PANEL BOARD
Filed May 28, 1921   2 Sheets-Sheet 1

WITNESS Ernest Moxter
Wm H Strack

FREDERICK B. ADAM
INVENTOR.

BY
Roy M. Eilers
ATTORNEY.

July 21, 1931.  F. B. ADAM  1,815,038
PANEL BOARD
Filed May 28, 1921  2 Sheets-Sheet 2

WITNESS

FREDERICK B. ADAM
INVENTOR.

BY
ATTORNEY.

Patented July 21, 1931

1,815,038

UNITED STATES PATENT OFFICE

FREDRICK B. ADAM, OF ST. LOUIS, MISSOURI

PANEL BOARD

Application filed May 28, 1921. Serial No. 473,339.

My invention consists in the construction and arrangement of parts hereinafter described and particularly pointed out in the claims. In describing the various arrangements employed and shown in the drawings hereto attached and described in the specification, I do not limit my invention to the precise form or construction of apparatus shown, or the several parts thereto, inasmuch as various alterations may be made without changing the scope of my invention.

Among the objects of my invention may be mentioned the production of an economically manufactured and readily assembled panelboard in which all the live parts are concealed. The other objects and advantages of my invention will appear in the remainder of this specification.

Figure 2:
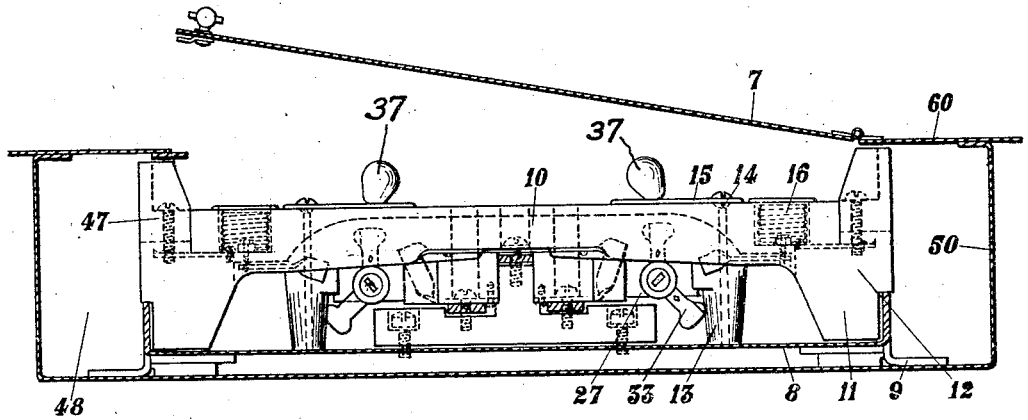
Figure 3:
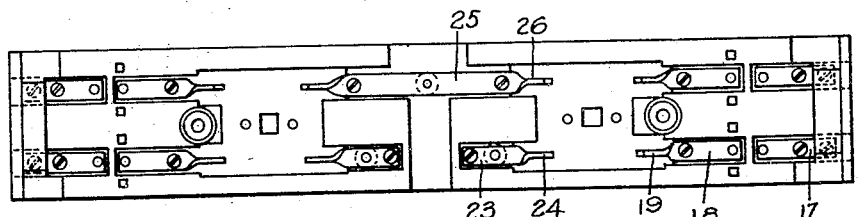
Figure 5:
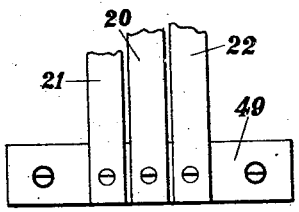
Figure 4:
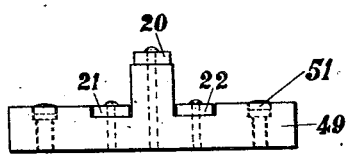

In the drawings, Fig. 1 is a front elevational view of a panelboard, with a portion broken away to show the bus bars, switch connection cleats and terminal cleats; Fig. 2 is a section along the line 2—2 of Fig. 1; Fig. 3 is an elevation of the under side of a panelboard section, the movable switch members being omitted for the sake of clearness; Fig. 4 is an end elevation of a terminal base and bus bar support; and Fig. 5 is a plan view of the terminal base and bus bar support shown in Fig. 4, only fragmentary portions of the bus bars being shown.

In the drawings, 50 is a cabinet box having a trim 60 and door 7. 8 is a metallic back, preferably of steel, borne on the corner supports 9, which corner supports are attached to the back of the cabinet box 50. 10 is a panelboard member, preferably made of insulating material. 11 are legs, preferably integral with the section 10. 12 is an extension of the panelboard member beyond the legs. 13 is a support, preferably integral with the panelboard member having an aperture extended through the panelboard member, so that a screw or bolt 14 may be passed therethrough and attached to the metallic back 8. This screw or bolt 14 serves to ground a card holder 15, which is of metal. 16 is a fuse receptacle, suitably attached to the terminal member 17. 18 is a fuse cleat having a switch contact 19. Although I have shown my invention applicable to a three wire main it is obvious that my invention may be applied to a two, four, or more wire system. I have designated the neutral bus bar as 20 and the other bus bars 21 and 22. 23 is a bus bar cleat connected with bus bar 22 and having a switch contact 24. 25 is the neutral bus bar cleat having a switch contact 26. It is obvious that the main switch as herein shown would make and break contact between the three leading in conductors and the three local bus bars. Inasmuch as I have shown my invention embodied in a three wire system it is unnecessary to describe in further detail the arrangement of the other half of the panelboard member. However, I do not limit myself to a panelboard member having the same arrangements of parts on each side, as various arrangements of parts may be made according to the requirements of the particular installation. 27 is a switch. 37 is a switch handle, which may be attached to a switch lever (not shown) by any suitable means such as riveting.

In the assemblage of my panelboard I use a bottom member 42 which has attached to it a switch adapted to open and close the mains. This switch is shown at 43. 44 are screws extending through the bottom member 42 and fastening the same to the metallic back. I then build up my panelboard with such additional members having switches and fuse connections as are necessary for that particular board and on the top of the board I place a top member 45. Through each of these members extend apertures 44 and screws are passed through them to fasten them to the metallic back. I prefer to counter-sink the apertures so that there may be a recess remaining after the screws are in position, which recess I fill with a plug of insulating material. The assemblage is firmly held together and at the same time any one section may be readily removed or replaced without the removal of the adjacent sections. The face of the panelboard, therefore, has no live metal parts. 47 is a barrier which may be integral with the panelboard members but I prefer to make the same detachable therefrom. Its object is to separate the compartment 48 from the face of the panel. 49 is a terminal base and bus bar support preferably made of insulating material. 51 is a screw or bolt for fastening the terminal base or bus bar support, shown in Figs. 4 and 5 to the metallic back.

This terminal block preferably consists of molded material of a shape to support the bus bars, arranged as shown, and prevents the bus bars from coming in contact with the metallic back. This terminal block is provided with suitable holes for the reception of the screws 51, and for the reception of screws to keep the bus bars in position, and it also has recesses, as shown in Fig. 4, which provide seats for the bus bars 21 and 22 which are attached thereto, preferably by means of screws.

I claim as my invention:

1. In a panelboard, the combination of a cabinet box, a panelboard member adapted to fit within the cabinet box, a switch, including contacts, attached to the rear of the panelboard member and having a handle extending through the panelboard member to the front of the panelboard member, and bus bars suitably positioned at the rear of the panelboard member and electrically connected with the panelboard member.

2. In a panelboard, the combination of a cabinet box, a panelboard member adapted to fit within the cabinet box, fuse connections attached to the panelboard member, a switch frame and blades on the rear of the panelboard member, a switch handle extending through and to the front of said panelboard member, switch contacts supported on the rear of the panelboard member, and bus bars suitably positioned at the rear of the panelboard member and electrically connected with the switch contacts.

3. In a panelboard, the combination of a cabinet box, a panelboard member adapted to fit within the cabinet box, fuse connections on the panelboard member, a switch mechanism attached to the rear of the panelboard member, switch operating means extending through the panelboard member to the front thereof, a bus bar suitably positioned at the rear of the panelboard member, and a switch contact supported by and on the rear of the panelboard member and detachably connected with the bus bar.

4. In a panelboard, the combination of an enclosing cabinet box, a plurality of removable panelboard members, blank panelboard end members, bus bars suitably positioned at the rear of the panelboard members, supporting means for the bus bars, covered by said end members, a switch supported at the rear of a panelboard member and having its operating means extending through to the front of the panelboard member, and cleats, disposed between the panel board member and bus-bars, adapted to electrically connect the switch and bus bars.

5. In a panelboard, the combination of a cabinet box, a panelboard member adapted to fit within the cabinet box, a switch mechanism attached to the rear of the panelboard member, means associated with the panelboard member to space the switch mechanism from the back of the cabinet box, switch operative means extending through the panelboard member to the front thereof, switch contact cleats carried by the panelboard member, bus bars supported back of the panelboard member, and means for electrically connecting the bus bars and cleats.

6. A panelboard, comprising a cabinet box, a panelboard member adapted to be positioned within the box, means adapted to position the panelboard member at a distance from the rear of the box, a switch mechanism attached to the back of the panelboard member, switch operating means extending to the front of the panelboard member, switch contact carrying cleats and fuse connections carried on the rear of said panelboard member, and bus bars positioned back of the panelboard member and electrically connected with the panelboard member.

7. In a panelboard, the combination of a cabinet box, a one-piece panelboard member adapted to fit within the box, supports for said panelboard member providing an uninterrupted space between the rear of the panelboard member and the wall of the cabinet box, a wiring compartment, a barrier associated with the panelboard member for closing the wiring compartment, a switch mechanism attached to and supported at the rear of the panelboard member, switch operative means extending to the front of the panelboard member, switch contact cleats attached to and carried by the panelboard member, and bus bars positioned at the rear of the panelboard member.

8. In a panelboard, the combination of a cabinet box, a one-piece panelboard member adapted to fit within the box, supports for said panelboard member providing an uninterrupted space between the rear of the panelboard member and the wall of the cabinet box, a wiring compartment, a barrier disposed between the panelboard member and a portion of the cabinet for closing the wiring compartment, a switch mechanism attached to and supported at the rear of the panelboard member, switch operative means extending to the front of the panelboard member, switch contact cleats attached to and carried by the panelboard member, bus bars, and means for attaching the panelboard member to the bus bars, and electrically connecting the cleats therewith.

9. A dead-front sectional panelboard, assembly including a cabinet box, a plurality of one-piece dead-front recessed sections adapted to be individually removably fitted in the cabinet box, fuse connections carried by certain of the panelboard sections, a bus bar and switch mechanism attached to the rear of certain of said sections, and barrier members disposed in the recessed portions of certain of the sections, and extending between the face of said sections and the cabinet box.

10. A sectional panelboard comprising a plurality of members adapted to be individually, removably suspended within a cabinet box, a bus bar, switches mounted on the rear of certain of said panelboard members, switch handles extending from said switches through said panelboard members, and cleats attached to the rear of said panelboard members and adapted to electrically connect the switches and bus bar.

11. In a sectional panelboard, the combination of a plurality of selectively removable panelboard members adapted to be fitted within a cabinet box, a cabinet box, means for positioning said panelboard members at a predetermined distance from the back of the cabinet box, a wiring compartment, barriers extending outwardly from the panelboard members to a wall of the box and co-operating with the panelboard members for closing the wire compartment, switches, mounted on the rear of the panelboard members, switch operative means extending from the switches to the front of the panelboard members, and bus bars positioned back of the panelboard members and electrically connected with the panelboard members.

12. In a sectional panelboard, the combination of a cabinet box, having an opening for access to its interior, and a door for said opening, a plurality of one-piece panelboard sections adapted to fit within the cabinet box and extend across the door opening of the box, switches mounted on the back of certain of the panelboard sections, switch operative means extending from the switches through said panelboard sections, bus bars back of the panelboard sections, and means for detachably connecting the bus bars and the panelboard sections.

13. In a sectional panelboard, the combination of a cabinet box, a plurality of panelboard sections formed of insulating material and adapted to extend across the door opening of the cabinet box, switches attached to the back of a plurality of such panelboard sections and having the operative means extending through and in front of the panelboard sections, and bus bars detachably engaged by the switches on the panelboard sections.

14. In a panelboard the combination of a cabinet box, one or more panelboard members adapted to fit within said box, a switch with appropriate contacts carried upon the rear of said panelboard member, and switch operative means extending through and in front of said panelboard member.

15. In a panelboard the combination of a cabinet box, one or more panelboard members adapted to fit within said box, a switch with appropriate contacts carried upon the rear of said panelboard member, switch operative means extending through and in front of said panelboard member, bus bar units electrically connected to the rear of said panelboard members, and means, accessible from the front of the panelboard members, for connecting the bus-bar units with the panelboard members.

16. A panelboard section composed of a single piece of insulating material, a switch, and conducting elements; the switch mechanism and conducting elements being mounted on one face of the insulating material and the switch handle extending through the insulating material to the opposite face thereof.

FREDRICK B. ADAM.